United States Patent
Bickford et al.

(10) Patent No.: US 10,938,844 B2
(45) Date of Patent: Mar. 2, 2021

(54) PROVIDING SECURITY THROUGH CHARACTERIZING MOBILE TRAFFIC BY DOMAIN NAMES

(71) Applicant: AT&T Intellectual Property I, L.P., Atlanta, GA (US)

(72) Inventors: Jeffrey Bickford, Thornton, CO (US); Wei Wang, Weehawken, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 256 days.

(21) Appl. No.: 15/217,279

(22) Filed: Jul. 22, 2016

(65) Prior Publication Data
US 2018/0027416 A1    Jan. 25, 2018

(51) Int. Cl.
| | | |
|---|---|---|
| *H04L 29/06* | (2006.01) | |
| *H04W 4/12* | (2009.01) | |
| *H04W 12/12* | (2021.01) | |
| *H04L 12/851* | (2013.01) | |
| *H04L 29/12* | (2006.01) | |

(52) U.S. Cl.
CPC .......... *H04L 63/1425* (2013.01); *H04W 4/12* (2013.01); *H04W 12/1208* (2019.01); *H04L 47/2441* (2013.01); *H04L 61/1511* (2013.01); *H04L 63/1458* (2013.01)

(58) Field of Classification Search
CPC .... H04W 12/12; H04W 4/12; H04L 47/2441; H04L 63/1425; H04L 63/1458
USPC .......................................................... 726/23
See application file for complete search history.

(56) References Cited

U.S. PATENT DOCUMENTS

| | | | |
|---|---|---|---|
| 7,836,133 B2 | 11/2010 | Quinlan et al. | |
| 8,087,088 B1 | 12/2011 | Pennington et al. | |
| 8,112,804 B2 | 2/2012 | Kwon et al. | |
| 8,122,493 B2 | 2/2012 | Drako et al. | |
| 8,214,497 B2 | 7/2012 | Alperovitch et al. | |
| 8,291,495 B1 | 10/2012 | Burns et al. | |
| 8,413,209 B2 | 4/2013 | Aldera et al. | |
| 8,495,700 B2 | 7/2013 | Shahbazi | |
| 8,762,298 B1 | 6/2014 | Ranjan et al. | |

(Continued)

FOREIGN PATENT DOCUMENTS

| | | | | |
|---|---|---|---|---|
| EP | 2975873 A1 | * | 1/2016 | ........... H04L 63/145 |
| WO | WO 03/077071 | | 9/2003 | |

(Continued)

OTHER PUBLICATIONS

Lever, Charles, et al. "The Core of the Matter: Analyzing Malicious Traffic in Cellular Carriers." NDSS, 2013. http://chazlever.com/publications/lever-ndss13.pdf.

(Continued)

*Primary Examiner* — Andrew J Steinle
*Assistant Examiner* — Sakinah White Taylor (57) ABSTRACT

A method, computer-readable medium, and apparatus for classifying mobile traffic for securing a network or a mobile user endpoint device are disclosed. For example, a method may include a processor for classifying mobile network traffic using a probabilistic model for a plurality of mobile software applications based on a distribution of domain names, detecting an anomaly associated with a mobile software application of the plurality of mobile software applications, and performing a remedial action to address the anomaly.

18 Claims, 4 Drawing Sheets

(56) References Cited

U.S. PATENT DOCUMENTS

| | | | |
|---|---|---|---|
| 8,844,033 B2 | 9/2014 | Song et al. | |
| 8,856,869 B1 | 10/2014 | Brinskelle | |
| 8,966,625 B1 | 2/2015 | Zuk et al. | |
| 9,094,311 B2 | 7/2015 | Raleigh et al. | |
| 9,125,060 B2 | 9/2015 | Maria | |
| 9,137,701 B2 | 9/2015 | Raleigh et al. | |
| 9,191,402 B2 | 11/2015 | Yan | |
| 9,253,201 B2 | 2/2016 | Song et al. | |
| 9,294,498 B1 | 3/2016 | Yampolskiy et al. | |
| 9,319,421 B2 | 4/2016 | Ferragut et al. | |
| 9,369,433 B1 | 6/2016 | Paul et al. | |
| 9,405,813 B1* | 8/2016 | Qian | H04L 67/303 |
| 2003/0163567 A1* | 8/2003 | McMorris | H04L 29/06 709/225 |
| 2004/0193943 A1 | 9/2004 | Angelino et al. | |
| 2007/0240219 A1* | 10/2007 | Tuvell | G06F 21/564 726/24 |
| 2009/0144823 A1* | 6/2009 | Lamastra | H04L 51/12 726/22 |
| 2011/0026853 A1* | 2/2011 | Gokturk | G06F 16/5838 382/305 |
| 2011/0145920 A1* | 6/2011 | Mahaffey | G06F 21/564 726/22 |
| 2011/0251984 A1* | 10/2011 | Nie | G06Q 10/10 706/18 |
| 2012/0179801 A1* | 7/2012 | Luna | H04L 61/1511 709/223 |
| 2012/0198549 A1* | 8/2012 | Antonakakis | H04L 61/1511 726/22 |
| 2012/0222120 A1* | 8/2012 | Rim | G06F 21/566 726/24 |
| 2012/0233656 A1* | 9/2012 | Rieschick | H04L 63/1441 726/1 |
| 2012/0284791 A1* | 11/2012 | Miller | G06N 7/005 726/22 |
| 2013/0097706 A1 | 4/2013 | Titonis et al. | |
| 2014/0298460 A1* | 10/2014 | Xue | H04L 63/1425 726/23 |
| 2015/0012257 A1* | 1/2015 | Backholm | H04L 41/145 703/13 |
| 2015/0058488 A1 | 2/2015 | Backholm | |
| 2015/0163121 A1* | 6/2015 | Mahaffey | G06F 11/0766 707/687 |
| 2015/0381637 A1* | 12/2015 | Raff | H04L 63/145 726/23 |
| 2016/0044054 A1* | 2/2016 | Stiansen | H04L 63/1416 726/24 |
| 2016/0065597 A1 | 3/2016 | Nguyen et al. | |
| 2016/0234167 A1* | 8/2016 | Engel | H04L 63/1408 |
| 2016/0275303 A1* | 9/2016 | Narayanaswamy | G06F 21/6218 |
| 2017/0063887 A1* | 3/2017 | Muddu | G06F 3/04847 |

FOREIGN PATENT DOCUMENTS

| | | |
|---|---|---|
| WO | WO 2008/091980 | 7/2008 |
| WO | WO 2016/057691 | 4/2016 |

OTHER PUBLICATIONS

Lever, Chaz. "Characterizing Malicious Traffic on Cellular Networks: A Retrospective." RSA Conference 2015: Apr. 20-24. https://www.rsaconference.com/writable/presentations/file_upload/mbs-w01-characterizing-malicious-traffic-on-cellular-networks-a-retrospective.pdf.

Raghuramu, Arun, Hui Zang, and Chen-Nee Chuah. "Uncovering the footprints of malicious traffic in cellular data networks." International Conference on Passive and Active Network Measurement, Springer International Publishing, 2015. http://escholarship.org/uc/item/10k6c6hb.pdf.

Ah Reum Kang, Jeffrey Spaulding, and Aziz Mohaisen. "Domain Name System Security and Privacy: Old Problems and New Challenges." University at Buffalo, Jun. 22, 2016. https://arxiv.org/pdf/1606.07080.pdf.

Qian, Feng, Subhabrata Sen, and Oliver Spatscheck. "Characterizing resource usage for mobile web browsing." Proceedings of the 12th annual international conference on Mobile systems, applications, and services, ACM, 2014. https://pdfs.semanticscholar.org/ba09/1d1da30ba8e69402873d1307937690a41e04.pdf.

* cited by examiner

PROVIDING SECURITY THROUGH CHARACTERIZING MOBILE TRAFFIC BY DOMAIN NAMES

The present disclosure relates generally to methods, computer-readable media and apparatuses for characterizing mobile traffic.

BACKGROUND

It is challenging to provide security to a network operated by a network service provider, e.g., an access network or a core network operated by the network service provider. There are many instances in which a network or components of the network may be under attack by malicious individuals, e.g., a denial-of-service (DoS) attack that attempts to make a network resource unavailable to users, or to simply interrupt or suspend a service of a host connected to the Internet. Such attacks may originate from a multitude of user mobile endpoint devices that may have been infected with malware that is used in the DoS attack. Thus, securing the network and the numerous endpoint devices continue to be challenging.

SUMMARY

In one example, the present disclosure discloses a method, computer-readable medium, and apparatus for classifying mobile traffic for securing a network or a mobile user endpoint device. For example, a method may include a processor for classifying mobile network traffic using a probabilistic model for a plurality of mobile software applications based on a distribution of domain names, detecting an anomaly associated with a mobile software application of the plurality of mobile software applications, and performing a remedial action to address the anomaly.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, computer-readable media and apparatuses for securing a network or a mobile endpoint device. Characterizing mobile traffic is important to network operators (broadly network service providers) from a network performance and security standpoint. For example, such as a security threat or performance degradation, it is useful to know that traffic is being generated by a specific mobile software application running on a mobile endpoint device.

With the rise of mobile endpoint devices, the number of possible mobile software applications on a network has increased enormously. Previously on laptop or desktop computers, users may only have had a handful of different applications with their own network protocols that can be identified. On mobile endpoint devices, app stores have created a distribution channel for millions of mobile software applications that can be downloaded with the click of a button. As of 2015, both the Google® Play and Apple® App Store had approximately over 1.5 million applications available for download. Due to the large number of mobile software applications and increasing traffic volume in mobile networks, mobile traffic monitoring and characterization is especially beneficial in order to detect security issues, to assist customer (e.g., enterprise customers and/or parental customer) management of permissible mobile software applications, to optimize the network, to plan for future capacity, and/or to detect resource constraints caused by mobile software application behaviors.

In one embodiment of the present disclosure, the present method generates a probabilistic model of a mobile application based on a distribution of domain names. It has been observed that a large portion of mobile applications contain domain names that are critical to how the application functions. Network operators or service providers can use this model to verify if a set of one or more domain names is associated with a mobile application during a security event or associated with a performance issue. Based on an analysis of real mobile network traffic, the model can correctly correlate domain names with associated applications with a high rate of accuracy, e.g., over 90% in various scenarios. These results show that identifying mobile software applications by domain names provides a unique advantage and is a highly scalable solution.

In one example, it is beneficial for network operators or service providers to understand various aspects of the mobile traffic traveling across their networks to maintain a high quality of service for their customers. On mobile networks, mobile traffic is typically generated by software applications running on mobile endpoint devices. Though most traffic resides over HTTP, it is sometimes useful to understand what specific software applications are generating the mobile traffic. This type of knowledge is very useful in providing one or more remedial actions, e.g., actions that respond to a security threat, actions that respond to a network performance issue, actions that respond to a future capacity planning issue, and actions that respond to a policy enforcement issue.

In some scenarios, software applications on mobile endpoint devices have been observed to utilize network resources poorly and introduce unnecessary load on both the network and the user mobile endpoint devices. For example, some software applications, such as Pandora®, were found to use more resources than necessary due to frequent transmission of small control messages resulting in reduced battery life on the user mobile endpoint devices and unnecessary signaling load on the network. By monitoring the network and identifying inefficient mobile traffic due to particular software applications, the network service providers will be able to detect various performance or security issues and to implement appropriate remedial actions, e.g., contacting the software application developers and eventually reducing unnecessary mobile traffic load on the network. More specifically, knowing which mobile software applications are used during a specific time or location can further provide more information for future capacity planning and network optimization. In another example, proper identification of mobile software applications from the network can also be useful for assisting enterprise customers in utilizing various network services or for parental controls. For example, an enterprise customer, e.g., a business entity or a governmental agency having a large number of employees, may not want its employees to have certain mobile software applications on the smart phones that are issued by the business entity, for security reasons (e.g., software applications that may track the users or have questionable origin) or for ethical reasons (e.g., software applications that are for adult entertainment) and so on. Similarly, parents may not want their children to have certain mobile software applications on their smart phones that are provided by the parents, again for security reasons or for ethical reasons.

In the example of a mobile malware threat, network service providers will want to be able to identify the specific mobile software application that is causing harm to their network and customers. For example, user mobile endpoint devices that were infected with an SMS spamming botnet, may send thousands of unwarranted messages per day. In other malware scenarios, malware may turn mobile endpoint devices into an international SMS proxy, resulting in large accidental costs to infected customers and the network service provider. In these types of events, being able to identify infected user mobile endpoint devices would allow a network service provider to quickly reduce the spread of infection as well as harm to both the network and customers.

Some approaches to network traffic characterization may only result in identification of coarse-grained application types, such as web application, email application, and DNS application. However, these coarse-grained or generic classification approaches do not have the capability to identify a particular mobile software application. In other words, knowing that email applications in general are causing a problem in the network is not as useful when compared to the network being able to detect a particular email mobile software application causing the problem. Furthermore, generic classification approaches may characterize generic network traffic by using ports to identify software applications. Unfortunately, many application developers have decided to use a common protocol and port for communication, such as HTTP or HTTPS, thereby rendering most of these generic classification approaches useless. In fact, some developers may purposely attempt to obfuscate the ports used to avoid detection by network service providers.

Some approaches may identify mobile software applications through a detailed inspection of Hypertext Transfer Protocol (HTTP) flows, e.g., performing a detailed analysis of the various fields within an HTTP header, including the URL field itself. Unfortunately, such methods are not scalable across large networks due to the significant cost of network probes, extremely large amount of mobile traffic volume that need to be analyzed, and the high cost computational resources, and storage.

In one embodiment, the present disclosure provides mobile software application identification by using domain names. For example, by using techniques, such as user-agent identification, as labeled data, the present disclosure generates a model based on domain name frequency. In one embodiment, this model is trained on a small subset (e.g., relative to the network size) of anonymized mobile traffic data where detailed HTTP network traces are available and captured. Once trained, the model is tested on less detailed network flow data which may only include TCP level flow information or domain name. This approach results in the ability to scale efficiently across very large networks. One aspect of the present disclosure is that mobile software applications are identified as a probabilistic model of domain names. It has been observed that a majority of mobile software applications, e.g., approximately 75%, contain domain names that are critical to how the mobile software application functions. As such, based on an analysis of real mobile network traffic, domains can be correctly correlated with mobile software applications at a high rate of accuracy, e.g., well over 90% for various scenarios. Using this probabilistic model of domain names, mobile traffic can be characterized in an efficient way that scales to large networks with limited visibility into network traffic. These and other aspects of the present disclosure are described in greater detail below in connection with the discussion of FIGS. 1-4.

Figure 1:
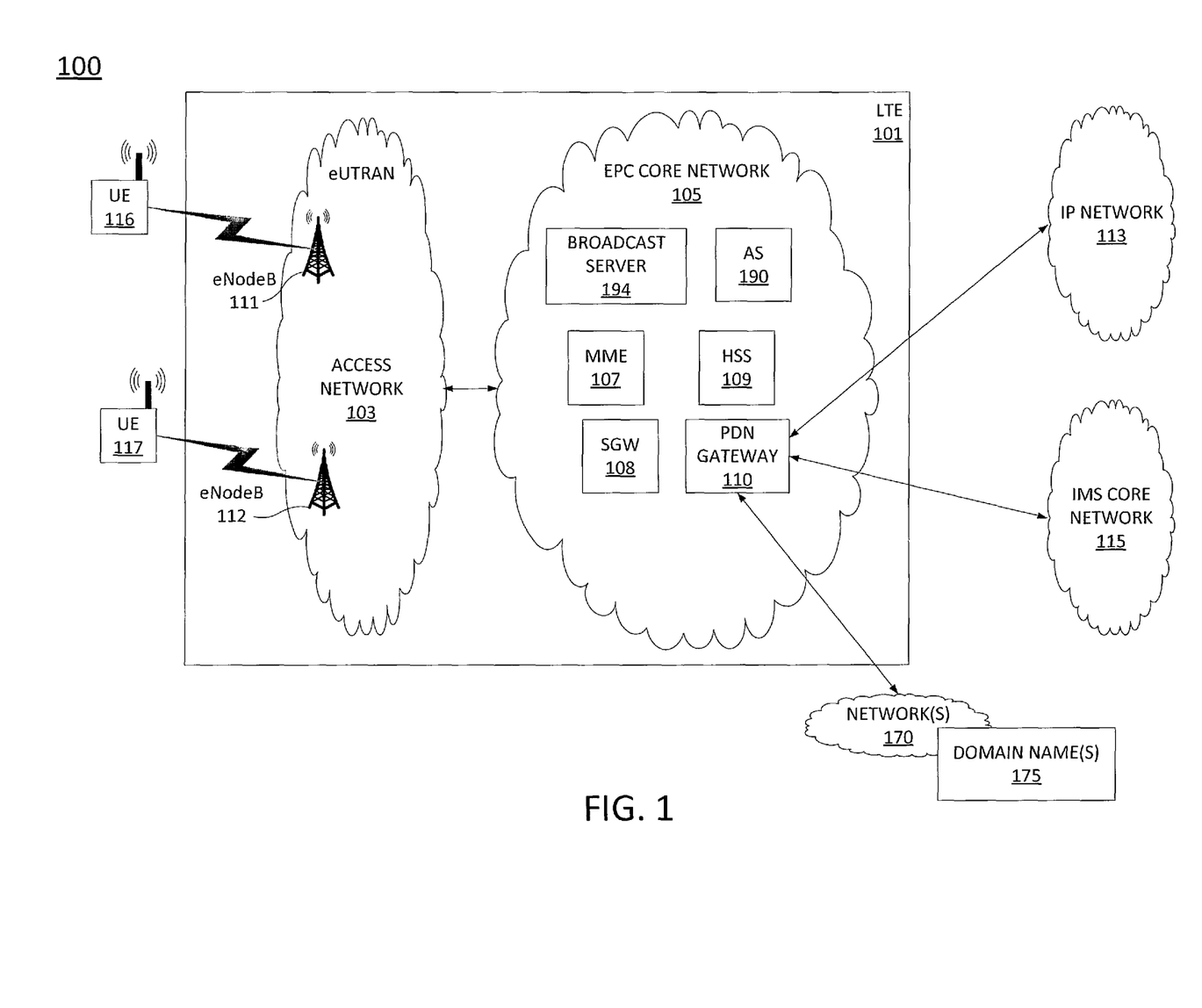
FIG. 1 illustrates an example system related to the present disclosure.

To better understand the present disclosure, FIG. 1 illustrates an example network, or system 100 suitable for implementing embodiments of the present disclosure for classifying mobile traffic for securing a network or a mobile user endpoint device. In one example, the system 100 comprises a Long Term Evolution (LTE) network 101, an IP network 113, and a core network, e.g., an IP Multimedia Subsystem (IMS) core network 115. In one example, system 100 is provided and operated by a cellular network operator. FIG. 1 also illustrates various user mobile endpoint devices, e.g., LTE user endpoint devices 116 and 117. The user mobile endpoint devices 116 and 117 may each comprise a cellular telephone, a smartphone, a tablet computing device, a laptop computer, a pair of computing glasses, a wireless enabled wristwatch, or any other cellular-capable mobile telephony and computing device (broadly, "mobile endpoint devices"). Each of the user mobile endpoint devices is capable of executing one or more mobile software applications, e.g., software applications for transmitting and/or receiving multimedia content, gaming, shopping, surfing the web, sending and receiving data, sending and receiving messages such as emails and text messages, implementing call sessions such as voice over IP calls, video conferencing, and the like.

In one example, the LTE network 101 comprises an access network 103 and a core network 105. In one example, the access network 103 comprises an evolved Universal Terrestrial Radio Access Network (eUTRAN). The eUTRANs are the air interfaces of the $3^{rd}$ Generation Partnership Project (3GPP) LTE specifications for mobile networks. In one example, the core network 105 comprises an Evolved Packet Core (EPC) network. An EPC network provides various functions that support wireless services in the LTE environment. In one example, an EPC network is an Internet Protocol (IP) packet core network that supports both real-time and non-real-time service delivery across a LTE network, e.g., as specified by the 3GPP standards. In one example, all eNodeBs in the access network 103 are in communication with the EPC network 105. In operation, LTE user equipment or user endpoints (UE) 116 may access wireless services via the eNodeB 111 and the LTE UE 117 may access wireless services via the eNodeB 112 located in the access network 103. It should be noted that any number of eNodeBs can be deployed in an eUTRAN. In one illustrative example, the access network 103 may comprise one or more eNodeBs.

In EPC network 105, network devices Mobility Management Entity (MME) 107 and Serving Gateway (SGW) 108 support various functions as part of the LTE network 101. For example, MME 107 is the control node for the LTE access-network. In one embodiment, it is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a public data network (PDN) gateway 110 which serves as a gateway that provides access between the EPC network 105 and various data networks, e.g., other IP networks 113, an IMS core network 115, and the like. The public data network gateway is also referred to as a PDN gateway, a PDN GW or a PGW.

The EPC network 105 may also include an application server (AS) 190. In one embodiment, AS 190 may comprise a computing system, such as computing system 400 depicted in FIG. 4, and may be configured to provide one or more functions for classifying mobile traffic for securing a network or a mobile user endpoint device, and for performing various other operations in accordance with the present disclosure. Accordingly, the AS 190 may be connected directly or indirectly to any one or more network elements of EPC network 105, and of the system 100 in general, that are configured to gather and forward network analytic information, such as signaling and traffic data, and other information and statistics to AS 190 and to receive instructions from AS 190. In addition, AS 190 may be configured to receive requests to implement one or more remedial actions as discussed below after classifying mobile traffics based on domain names. For example, one or more of the domain names 175 may be reached via networks 170. AS 190 may be further configured to perform other functions such as those described below in connection with the example methods 200 and 300 of FIGS. 2 and 3.

In one example, AS 190 may be deployed in a network operations center (NOC) of a cellular network operator, e.g., an entity operating the EPC network 105, LTE network 101, access network 103, and so on. Due to the relatively large number of connections available between AS 190 and other network elements, none of the actual links to the application server are shown in FIG. 1. Similarly, links between MME 107, SGW 108, broadcast server 194, eNodeBs 111 and 112, PDN gateway 110, and other components of system 100 are also omitted for clarity.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, AS 190, broadcast server 194 and/or other network components may be deployed in IMS core network 115 instead of being deployed within the EPC network 105, or in other portions of system 100 that are not shown, while providing essentially the same functionality.

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., 2G network, 3G network and the like), for classifying mobile traffic for securing a network or a mobile user endpoint device. Thus, these and other modifications are all contemplated within the scope of the present disclosure.

Network resource inefficiencies caused by mobile software applications using small periodic transfers of data have been identified as causing poor battery life on mobile endpoint devices and increasing load on the wireless network and control channels. The present disclosure discloses a method for helping network service providers to identify the specific mobile software applications that may be causing this type of unnecessary load on the network. Network service providers could potentially notify these app developers to help them create a more device and network friendly application. Along with monitoring mobile networks for performance reasons, mobile malware has also risen to become a prime concern for network service operators and mobile device users. Various systems may correlate mobile network traffic by using privileged host-based monitoring tools installed on a mobile endpoint device, which cannot be easily deployed by network service providers to protect their whole network from malware. Furthermore, customers may be uncomfortable with the idea of having privileged host-based monitoring tools being installed on their mobile endpoint devices due to their general distrust of other entities monitoring their mobile traffic activities.

The present disclosure uses a method that models mobile software applications by domain names, which can help identify infected user mobile endpoint devices of a malicious application in a scalable way without the need of a host-based agent. One aspect of the present approach is to identify mobile software applications using a limited set of data collected from the network, specifically domain names and IP addresses. The present method is able to efficiently identify the mobile software applications directly from the mobile traffic after a probabilistic model is trained to properly identify the mobile software applications. Although the results show that certain comprehensive detailed packet inspection techniques are feasible, when scaling to large networks with millions of customers, these comprehensive detailed packet inspection techniques may not scale to large networks.

In one example, in order to reduce the amount of detailed or intensive inspection of mobile traffic during actual classification, the present method instead only uses such intensive application identification techniques on only a small amount of data for the labeling and training phase. Using the training data, the present disclosure is able to generate a probabilistic model of mobile software applications to identify the mobile network traffic associated with them. This trained probabilistic model can then be scaled across the network, where more limited and less expensive datasets exist, such as those that only contain domain names or IP addresses. The model will predict the association between applications and network traffic. It should be noted that the present embodiment does not require the direct extraction of domain names from the traffic. For example, in an alternative embodiment, if the domain names are mapped to other types of information, e.g., IP addresses and the like, the probabilistic model can be trained on the IP addresses instead since the IP addresses are mapped to the domain names. Similarly, if the domain names are mapped to other types of information, then the probabilistic model can be trained on these other types of information instead.

In one embodiment, the present disclosure assumes that many applications will contain "functional domain names" that are critical to how a mobile software application will work. For example, an online multiplayer game often must communicate with a server, e.g., example.com, to function properly, thus example.com is a functional domain to this game software application. Without this network traffic, the core functionality of the mobile software application would not exist. The present disclosure expects that these functional domain names are unique to a specific mobile software application or are sometimes shared among a small number of mobile software applications created by the same developer. One observation is that these functional domain names can greatly help identify a specific mobile software application using only mobile network traffic.

Most mobile software applications will also generate traffic to digital advertising networks or user tracking and statistic services. In this case, domains related to these third party services will most likely be common and shared among many different mobile software applications across different developers. Since advertisements and usage statistics are fundamental to a developer's revenue stream, they may be just as important as functional domains, but the difference is that they are typically shared among many different mobile software applications. In some cases, mobile software applications may generate arbitrary user-initiated traffic that may or may not be similar across users of the same mobile software application. For example, users may share their high scores of a game on a social network through the mobile software application. These other domain names are referred to as "non-functional domain names."

Given these observations about a mobile software application's network traffic, the present disclosure generates a probabilistic model to characterize a mobile software application based on detailed HTTP flow data for a small subset of the network during the training phase. Using this trained model on more generic flow data which contains only domain names or IP level information, the present disclosure can then identify applications from only the domain names being visited. In one embodiment, it should be noted that in the present method, mobile traffic generated by web browsers will not be considered, as this type of traffic is highly variable by nature and user dependent.

In order to train the model, the present method needs to identify which mobile software application generated the mobile traffic to specific domain names. In one example, the present method will rely on the HTTP user-agent to identify application traffic during the training phase, on a relatively small set of data when compared to the entire network. In this illustrative example, the present method will work for mobile operating systems that place the application name in the user-agent field, such as iOS. Other techniques can be used to identify application traffic on other operating systems, such as Android, if the HTTP user-agent cannot be used to identify the mobile software application traffic. In other words, the present disclosure is not limited to any particular method to provide the labels while training the model, as long as the type of data required is accessible.

For example in iOS, the user-agent defines an application name and version number as well as other identifiers related to the operating system itself. To illustrate, consider the following example:

User-Agent: agar.io/63 CFNetwork/711.4.6 Darwin/14.0.0

Format: app/versionnetworklib/versionkernel/version

The above example is an iOS user-agent for a multiplayer game. This user-agent shows that the application's name is "agar.io" and version number is "63." The present method may use this application name and version number to identify a mobile software application during the training phase.

In one example, one could represent a mobile software application as a finite set of domain names, each assigned with a probability between 0 and 1, representing how likely a mobile software application visits a domain name. In one example, one could execute each mobile software application a large number of times and count the number of times each domain name is observed in all executions. As long as the mobile software application is executed enough times (law of large numbers), the probability of a domain name associated with the mobile software application can be estimated by the fraction of executions at which the domain name appears. However, this process would not scale to all of the mobile software applications that exist today. Moreover from the network point of view, it is difficult to know when a mobile software application has started or ended executing.

Alternatively, the present method simulates a mobile software application execution using the network data. One can assume that if two flows with the same user-agent are observed from different users, each flow is treated as a different execution of the same mobile software application. Furthermore, if two flows for the same user-agent are observed from the same user, but during different periods of time, each flow is also considered a unique execution. It is assumed that functional domain names should always exist for each execution of a mobile software application, however in practice, one may not observe this in the mobile network traffic. For example, there may be a missing relationship due to traffic aggregation within a specific time window. Thus the probability of these functional domain names will not be always one, though they should be relatively high since the mobile software application requires them to function.

Based on these assumptions, the present method may aggregate mobile network traffic into hourly bins and count the number of unique anonymized users that traveled to a domain name with a unique user-agent. The present method may also keep track of how many unique users have traffic corresponding to a unique user-agent allowing the present method to generate probabilities for each domain and user-agent pair, which will be mathematically explained below.

The present method provides a model which accurately predicts the association between mobile software applications and their domain names. To illustrate, some notations will now be introduced. W represent the total number of unique domain names, and K the total number of unique mobile software applications observed during training. The training data D is a collection of m samples $\{x^{(i)}, y^{(i)}\}$ where $i \in [1 \cdot m]$. Here $x^{(i)}$ represents a set of domain names and $y^{(i)}$ is the mobile software application name.

To model an application as a set of probabilities representing the frequency of traffic to domain names, the present method uses a multidimensional Bernoulli distribution. In this model, one can assume the way that domain names are generated is by first choosing a mobile software application y to execute. The probability of the domain name $x_j$ being present in mobile software application y is represented by a Bernoulli distribution with success probability of $p\{x_j|y\}$. In the end, each mobile software application is represented as a feature vector with the length being equal to the number of unique domain names in the training data set. The $j^{th}$ element of the feature vector $x_j$ will be set to one, which represents mobile software application y has traffic connecting to the domain name j, otherwise, $x_j$ will be set to zero. Within a certain mobile software application, one can assume the domain names are conditionally independent, meaning given a mobile software application, the selection of one domain name will not affect that of another (Naive Bayes assumption). The model parameters include the class prior $Ø_k=p(y=k)$ as the probability of choosing mobile software application k to execute, as well as $Ø_{wk}=p(x_w=1|y=k)$ as the probability of $w^{th}$ domain name being present in the mobile software application k. Given the model, the joint likelihood of the training data can be computed as $\pi_{i=1}{}^m p(x^{(i)}, y^{(i)})$. Finally, by maximizing the joint likelihood with respect to the parameters, the present method will have the estimated parameters as:

$$\phi_{wk} = \frac{\sum_{i=1}^{m} 1\{x_w^{(i)} = 1 \wedge y^{(i)} = k\}}{\sum_{i=1}^{m} 1\{y^{(i)} = k\}}$$

$$\phi_k = \frac{\sum_{i=1}^{m} 1\{y^{(i)} = k\}}{m}$$

A natural interpretation for the estimated parameters, $\phi_{wk}$ and $\phi_k$, is that $\phi_{wk}$ is the fraction of times seeing mobile software application k in the data with domain name w in it and $\phi_k$ is the fraction of times seeing mobile software application k. Based on the labeled training data, it is straightforward to count the frequency of each domain name for each associated mobile software application. In order to make a prediction based on the testing data, given a set of domain names x, the present method can simply compute the posterior probability of these domain names being associated with application k as $p(y=k|x)$. The end result is the posterior probability of the testing sample being associated with all K mobile software applications. It should be noted that a domain name may be strongly associated with not only one but multiple mobile software applications due to various reasons, such as mobile software applications being developed by the same developer. By using the highest posterior probabilities, one can predict which mobile software applications are most likely to have generated mobile network traffic, represented by a set of domain names.

As discussed above, one can define "functional domain names" as the domain names that a mobile software application must frequently communicates with to properly function. One can expect that these functional domain names are unique to a specific mobile software application or are shared among a small number of mobile software applications created by the same developer. To identify the functional domain names of a mobile software application, the present method my use a "relevance score." More specifically, the relevance score $R_{wk}$ for domain w in mobile software application k is a convex combination between the probability of a mobile software application's association with a domain name and the domain name's relative association with all mobile software applications. In one example, the relevance score is defined as:

$$R_{wk} = \lambda \log(\phi_{wk}) + (1-\lambda)\log\left(\frac{\phi_{wk}}{\sum_{j=1}^{K} \phi_{wj}}\right)$$

The second term of the equation reduces the relevance of domain names that have high probability with many other mobile software applications (i.e. ad networks), while increasing the relevance for functional domain names that exist only within a small number of mobile software applications (i.e., mobile software applications developed by the same developer). By adjusting the parameter $\lambda$, one can balance the tradeoff between the association of a domain name with a single mobile software application and the domain name's association across all mobile software applications.

The following discussion will provide an illustrative example of the data used in training the model. It should not be interpreted as a limitation of the present disclosure. In one embodiment, the analysis and evaluation of the present method is based on anonymized HTTP flow data collected within a large U.S. cellular network provider. The anonymized HTTP flow data is a sample of the whole population at a rate of approximately 15%. The raw HTTP flows are extracted from the GTP tunnels at the packet gateways for both LTE and 3G traffic and contain various details about an HTTP packet, including an anonymized identifier that represents a user on the network. In order to label each domain name with an application during training, as explained above, the present method relies on the user-agent as one possible method of labeling. For this reason, in one embodiment the raw HTTP records are further parsed to generate a mapping between relevant HTTP user-agents, such as those related to iOS, and domain name. This results in analysis of approximately 5% of HTTP traffic. Other than user-agent and domain name, one can record counts for the number of unique anonymized users traveling to each domain name with the specific user-agent, as well as the number of unique anonymized users to each user-agent. In order to address privacy concerns, all domain names and counts are aggregated by user-agent and no user-specific information is used throughout the data collection and analysis.

In order to determine how many days of data are needed to train the model, one can explore how the number of unique user agents in the data changes over time. For example, it was noted that the number of unique new user agents is the difference between the cardinality of the accumulated user agents of one day and the previous day. Clearly, there are new user agents that may not have been observed yet in the network each day during a time period, e.g., a 30 day period. In one observation, the number of new user agents observed each day appears to stabilize around five days. There is no sign that the difference over time will converge to zero, since users will use different, upgraded, or completely new applications over time. Based on this illustrative observation, one can use between five to seven days of data for training the model.

In one embodiment, one can first evaluate the similarity of mobile software applications across different versions to validate aggregating their traffic together for analysis. As discussed above, each mobile software application version can be represented as a set of domain names with probability (p. One can measure the similarity of different mobile software application versions i and j by using the cosine similarity. In the present method, the cosine similarity is a scalar between 0 and 1, defined as $\phi_i \cdot \phi_j / (\|\phi_i\| \|\phi_j\|)$. The value of one meaning the domain name distributions for two mobile software applications are exactly the same, while zero indicating they are uncorrelated. Using this equation, the present method may calculate the similarity between each application version across a time period, e.g., 5 days of training data. It has been observed that mobile software applications have very similar domain set distributions across different application versions. For this reason, in one example the present method may aggregate application versions together into a single unique application for analysis.

As discussed above, in one example functional domain names are critical to help identify mobile software applications from the network and are measured by a relevance score R defined above. In one example, the higher the relevance score, the more likely that the domain name is functional to the mobile software application. When computing the relevance score, the parameter $\lambda$ can balance the tradeoff between the association of a domain name with a single mobile software application and the domain name's association across all mobile software applications. For example, for each $\lambda$ where $\lambda \in [0, 0.1, 0.2, \ldots, 1]$, one can look for a value that generates a clear boundary between functional and non-functional domain names. In one example, after analyzing many different values of $\lambda$ for the top 100 iOS applications during training, 0.2 is chosen to be the best in terms of differentiating between functional and non-functional domain names. However, it should be noted that this value is not a limitation of the present disclosure and may actually change over time as mobile traffic changes.

After selecting $\lambda=0.2$ to compute the relevance score, one can numerically determine the boundary between functional and non-functional domain names, $\tau_R$. A histogram of all relevance scores can be generated. The shape of the histogram suggests a bimodal distribution with the right-hand representing the scores for functional domain names and the left-hand representing the non-functional ones. A Gaussian mixture model (GMM) is then fit to the relevance scores and one can choose the 99% confidence interval on the left-tail of the right-hand Gaussian as the threshold, $\tau_R=-3.5$, to separate functional and non-functional domain names.

The final result of this analysis is a set of domain names and their relevance scores for each mobile software application. Within this set, there is a subset of domain names that have relevance scores higher than the determined threshold $\tau_R$, representing the mobile software application's functional domain names.

In one illustrative embodiment, during the training phase, five days of training data is used to fit the Naive Bayes model with multiple classes, where each class represents a unique mobile software application. For example, if there are 30,000 mobile software applications in the training set, then there are 30,000 classes in the trained model. The parameter estimation is applied by following the equations as discussed above. The final trained model will contain the estimated probability of each domain name and how it is associated to each mobile software application, as well as the estimated probability of observing each mobile software application in the network. During the testing phase, the trained model will predict the probability of each domain name and its association to each mobile software application. Due to the fact that non-functional domain names are shared among many mobile software applications, which are typically not of interest (e.g., analytics.google.com), domain names that are shared among more than 30 mobile software applications in the training period are ignored for testing. In this example, 30 was chosen because less than 1% of the domain names receive network traffic from more than 30 different mobile software applications throughout training. Again, this value is only illustrative and is not a limitation of the present disclosure.

After analyzing the dataset, several observations are made. It was observed that different versions of mobile software applications exhibit similar network behavior. For this reason, different versions of a mobile software application were aggregated together and treated as a single mobile software application in the present method. For each mobile software application, a relevance score was calculated for each domain name associated with it during training. By analyzing the distribution of relevance scores across all mobile software applications, one can numerically determine the boundary between functional and non-functional domain names. It was observed that approximately 75% of mobile software applications have at least one functional domain name, which are typically shared among a small number of mobile software applications. Mobile software applications which share functional domain names typically share the same developer. Nonfunctional domain names, tend to be shared among many mobile software applications, about two orders of magnitude higher than that of functional domain names.

It has been noted that new user-agents are seen each day in the network. Based on user-agent labeling of a mobile software application, new mobile software applications will likely emerge each day within a dataset. New mobile software applications may have functional domain names that are either shared among other mobile software applications with the same developer or are brand new domain names not seen in the training dataset. In the first case, a new mobile software application that shares domain names with previously known mobile software applications may be wrongly classified as one of the previously known mobile software applications from the training set. On the other hand, if the functional domain names are brand new, the new mobile software application will have a very low probability of being associated with any of the previously known mobile software applications. Because of this problem, in one example it is reasonable to have the model retrained periodically, e.g., on a daily basis, to include newly incoming data. This would allow the present method to correctly label new emerging mobile software applications over time as well as adjust domain name distributions for already known mobile software applications, making the model more accurate over time.

In some cases, mobile software applications use a shared service that is required for the mobile software application to function. These type of shared services would fall under our general definition of a functional domain name. It is also important for the network provider to identify applications using these shared services in the case of a performance degradation.

It should be noted that many mobile applications may use or are moving towards using HTTPS for communication with the Internet. This is highly recommended to mobile software application developers since mobile devices roam across many different types of networks. Unencrypted networks, such as free Wi-Fi hotspots, pose a danger to mobile software applications that send sensitive data over unencrypted HTTP connections. Although the present disclosure is described in view of HTTP traffic only, a similar approach can be applied to encrypted connections over HTTPS. The main problem with encrypted connections is training and obtaining a large amount of labeled data. Because of the present approach can use any method of training, instead of observing domain names directly, the network can observe TCP/IP flow information instead, such as IP address.

For example, network service providers typically maintain a DNS server as well, which understands the mapping between IP address and domain name. In this scenario, one may need to identify "functional IP addresses" instead of domain names alone.

Figure 2:
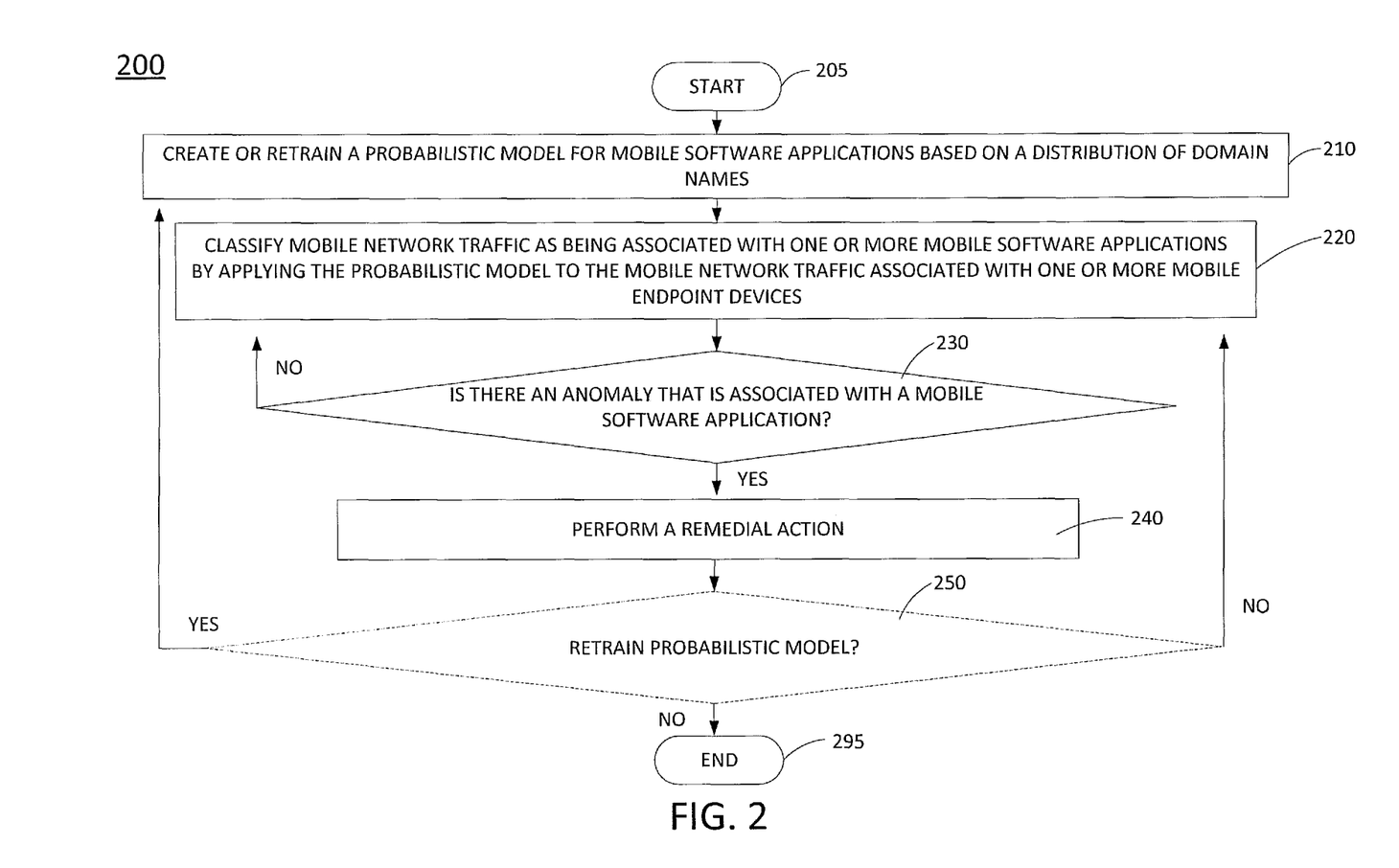
FIG. 2 illustrates a flowchart of an example method for classifying mobile traffic for securing a network or a mobile user endpoint device, according to the present disclosure.

FIG. 2 illustrates a flowchart of an example method 200 for classifying mobile traffic for securing a network or a mobile user endpoint device. In one embodiment, the steps, operations or functions of the method 200 may be performed by any one or more of the components of the system 100 depicted in FIG. 1. For example, in one embodiment, the method 200 is performed by the application server (AS) 190. In another embodiment, the method 200 is performed by AS 190 in coordination with other components of the system 100, such as broadcast sever 194 (for broadcasting various notifications), eNodeBs 111 and 112, and so forth. Alternatively, or in addition, one or more steps, operations or functions of the method 200 may be implemented by a computing device having a processor, a memory and input/output devices as illustrated below in FIG. 4, specifically programmed to perform the steps, functions and/or operations of the method. Although any one of the elements in system 100 of FIG. 1 may be configured to perform various steps, operations or functions of the method 200, the method will now be described in terms of an embodiment where steps of the method are performed by a processor, such as processor 402 in FIG. 4. For example, the processor may comprise a processor of a dedicated application server of a cellular network operator configured to classify mobile traffic for securing a network or a mobile user endpoint device.

The method 200 begins in step 205 and proceeds to step 210. In step 210, the processor creates a probabilistic model for mobile software applications based on a distribution of domain names. For example, as discussed above the model is trained on a small subset of data that contains detailed packet information to label which mobile software application a network flow was generated by. This operation can be performed offline as a preprocessing operation. In one embodiment, step 210 can be performed as a retraining of the probabilistic model if the probabilistic model has already been created. As discussed above, it may be necessary to retrain the probabilistic model on a periodic basis as new mobile software applications are adopted by users on an ongoing basis.

In step 220, the processor classifies mobile network traffic as being associated with one or more mobile software applications by applying the probabilistic model to the mobile network traffic associated with one or more mobile endpoint devices. As discussed above, once created or retrained, the trained model can then be scaled and applied across the network using high level network flow data.

In step 230, the processor determines whether an anomaly is detected that is associated with a mobile software application. As discussed above, network operators can use the trained model to verify whether a set of one or more domain names is associated with a particular mobile software application during a security event or performance issue. Broadly, an "anomaly" can be defined by the network service provider and/or a customer of the network service provider. For example, the network service provider may detect that a particular mobile software application is exchanging an exorbitant amount of short control messages between the user mobile endpoint devices and a website. In another example, the network service provider may detect a particular mobile software application is potentially responsible for a DoS attack or other malicious actions. In yet another example, the network service provider may detect a particular mobile software application being executed on a particular user mobile endpoint device, e.g., an enterprise customer may not want certain types of mobile software applications to be used on a company or government issued smart phone or a parent customer may not want certain types of mobile software applications to be used on a smart phone provided to a child of the parent. Additional parameters can be used in conjunction with the detection of the mobile software application, e.g., a location in which the mobile software application was used, a time of day in which the mobile software application was used, a duration in which the mobile software application was used, and so on. Any number of additional parameters can be set by the enterprise customer or the parent. If no anomaly is detected, the method returns to step 220. If an anomaly is detected, the method proceeds to step 240.

In step 240, the processor performs a remedial action. For example, if a security issue is detected as the anomaly, the network service may take one or more of the following remedial actions: contacting users to notify them as to a potential security problem associated with a mobile software application that they are using (e.g., requesting the users to deactivate or deinstall the offending mobile software application), blocking mobile traffic to and from a particular domain name, blocking mobile traffic to and from a particular mobile endpoint device, and the like. In another example, if a performance issue is detected as the anomaly, the network service may take one or more of the following remedial actions: contacting a developer to notify them as to a potential performance problem associated with a mobile software application that they have developed (e.g., requesting the developers to update or modify the offending mobile software application to address the performance issue, e.g., reducing the number or frequency of sending control or status messages and the like), blocking or throttling mobile traffic to and from a particular domain name, blocking or throttling mobile traffic to and from a particular mobile endpoint device, allocating additional network resources to address the performance issue (e.g., instantiating a new application server, a new media server, a new router, a new channel, adding additional bandwidth on a network element, and the like), informing network planner of performance issue to assist in future capacity planning, and the like. In another example, if a policy enforcement issue is detected as the anomaly, the network service may take one or more of the following remedial actions: contacting a customer (e.g., a business entity, a guardian, or a parent) to notify them as to a potential policy enforcement problem associated with a breach of a policy associated with a mobile software application that the customer has defined (e.g., notifying the customer that a mobile software application has been detected for a particular mobile endpoint device, notifying the customer that a mobile software application has been detected for a particular mobile endpoint device being used at a particular time of day, notifying the customer that a mobile software application has been detected for a particular mobile endpoint device being used at a particular location, and the like), blocking or throttling mobile traffic to and from a particular domain name, blocking or throttling mobile traffic to and from a particular mobile endpoint device, contacting users to notify them as to a potential policy enforcement problem associated with a mobile software application that they are using (e.g., requesting the users to deactivate or deinstall the offending mobile software application), and the like.

In optional step 250, the processor determines whether the probabilistic model needs to be retrained. As discussed above, it may be necessary to retrain the probabilistic model periodically given that new mobile software applications are continuously being offered and adopted by users. For example, the probabilistic model can be retrained daily, every two days, every week, or when the performance of the mobile traffic classification falls below a predefined threshold (e.g., falling below 70% accuracy) and the like. If retraining is required, the method returns to step 210 to retain the probabilistic model. If retraining is not required, the method returns to step 220 or alternatively, ends in step 295.

Figure 3:
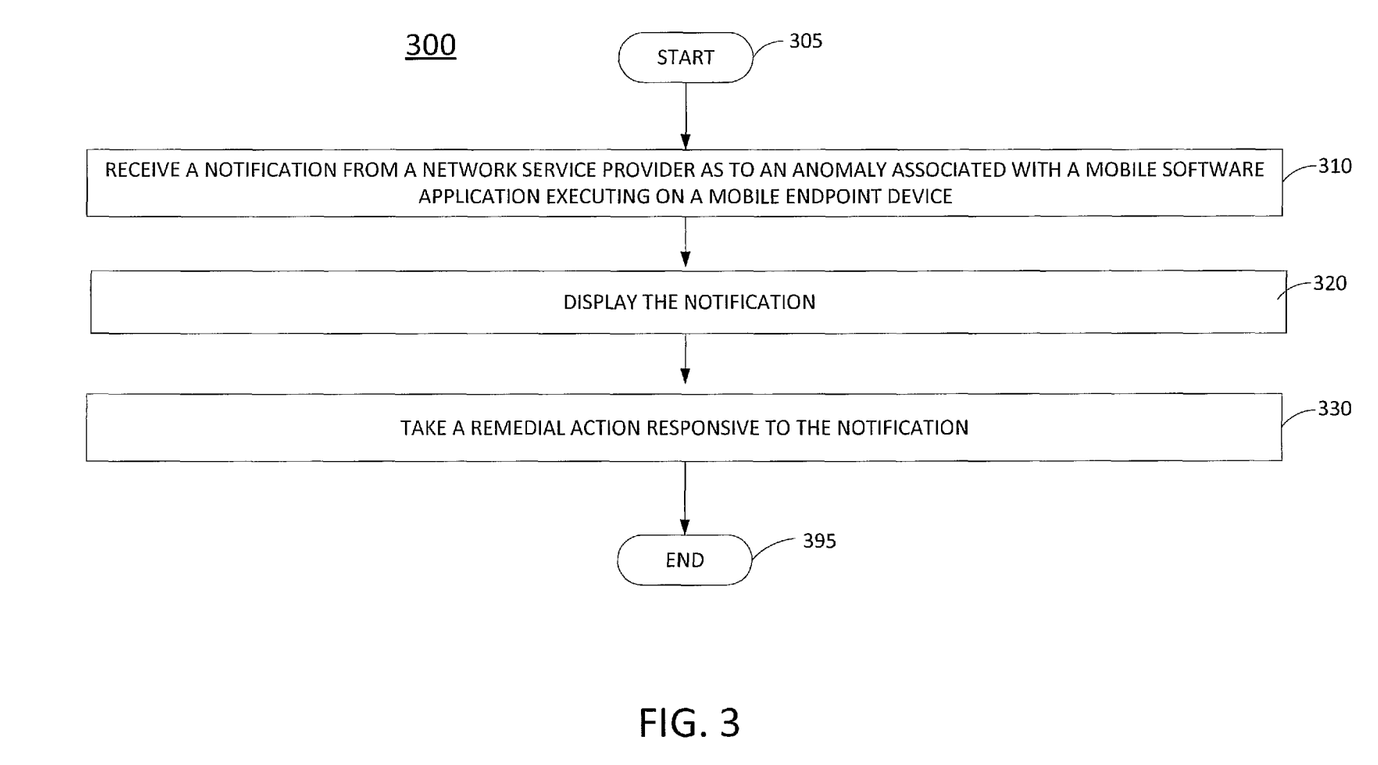
FIG. 3 illustrates a flowchart of an example method for receiving a notification from a network service provider as to a mobile software application having caused an anomaly.

FIG. 3 illustrates a flowchart of an example method 300 for receiving a notification from a network service provider as to a mobile software application having caused an anomaly. In one embodiment, the steps, operations or functions of the method 300 may be performed by any one or more of the components of the system 100 depicted in FIG. 1. For example, in one embodiment, the method 300 is performed by one of mobile endpoint devices 116 or 117. In another embodiment, the method 300 is performed by one of mobile endpoint devices 116 or 117 in coordination with other components of the system 100, such as application server 190, and so forth. Alternatively, or in addition, one or more steps, operations or functions of the method 300 may be implemented by a computing device having a processor, a memory and input/output devices as illustrated below in FIG. 4, specifically programmed to perform the steps, functions and/or operations of the method. Although various elements in system 100 of FIG. 1 may be configured to perform various steps, operations or functions of the method 300, the method will now be described in terms of an embodiment where steps of the method are performed by a processor, such as processor 402 in FIG. 4. For example, the processor may comprise a processor of a mobile endpoint device.

The method 300 begins in step 305 and proceeds to step 310. In step 310, the processor receives a notification from a network service provider as to an anomaly associated with a particular mobile software application executing on a mobile endpoint device. For example, the network service provider has detected a mobile software application operating on the user's mobile endpoint device as causing an anomaly as discussed above. In one example, the notification is sent directly to the user operating the mobile endpoint device. Alternatively, the notification is sent to an entity responsible for the mobile endpoint device, e.g., an enterprise customer such as a business entity or a governmental agency, a guardian, a parent and so on. Alternatively, the notification is sent to an entity responsible for the mobile software application, e.g., a developer of the mobile software application.

In step 320, the processor displays the notification to a user. For example, the notification is displayed on a screen of the user mobile endpoint device. Alternatively, the notification is displayed on a screen of an endpoint device of an enterprise customer such as a business entity or a governmental agency, a guardian, a parent and so on. Alternatively, the notification is displayed on a screen of an endpoint device of an entity responsible for the mobile software application, e.g., a developer of the mobile software application.

In step 330, the processor takes or performs a remedial action. For example, the processor may receive an input from the user to deactivate or deinstall the identified mobile software application listed in the notification. Alternatively, in one example, the processor may provide a software update for the identified mobile software application listed in the notification. Alternatively, in one example, the processor may send a second notification to the user of the mobile endpoint device to deactivate or deinstall the identified mobile software application listed in the first notification. For example, an employer or a parent having been informed of the anomaly, may decide to send a second notification directly to the user instructing the user to deactivate or deinstall the identified mobile software application listed in the first notification. Alternatively, the processor may automatically disable, deactivate and/or deinstall the identified mobile software application listed in the notification without any input from the user of the mobile endpoint device. Method 300 then ends in step 395.

Thus, the present disclosure provides advances in the field of network and mobile endpoint device monitoring by simply monitoring the mobile network traffic directly to identify a particular mobile software application via domain names. No custom software application is required to be downloaded to the mobile endpoint device and the present method can easily be scaled to very large network.

Figure 4:
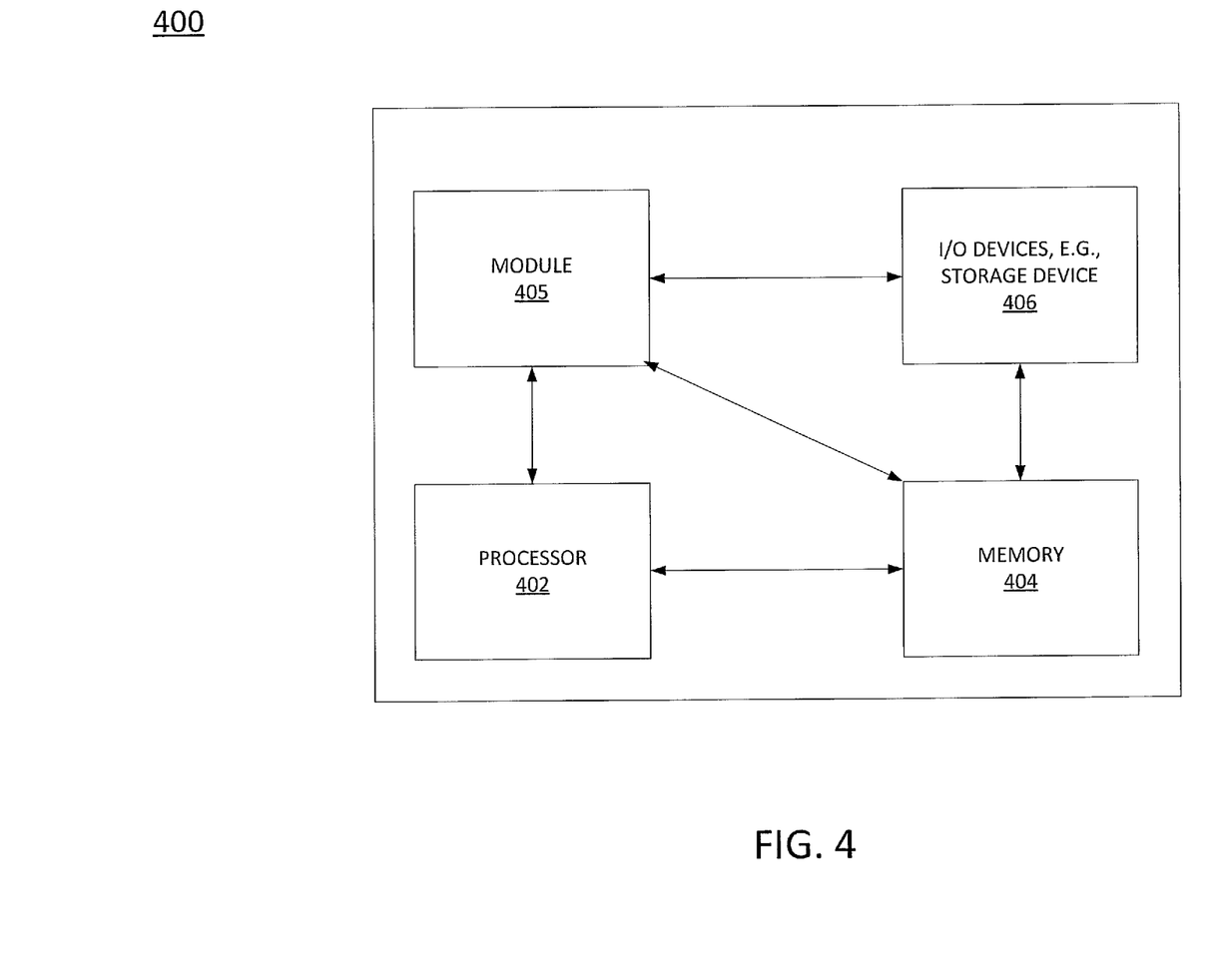
FIG. 4 illustrates a high-level block diagram of a computing device specially configured to perform the functions, methods, operations and algorithms described herein.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for classifying mobile traffic for securing a network or a mobile user endpoint device, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or the method 300 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The one or more hardware processors 402 can also be configured or programmed to cause other devices to perform one or more operations as discussed above. In other words, the one or more hardware processors 402 may serve the function of a controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed methods. In one embodiment, instructions and data for the present module or process 405 for classifying mobile traffic for securing a network or a mobile user endpoint device (e.g., a software program comprising computer-executable instructions) can be loaded into memory 404 and executed by hardware processor element 402 to implement the steps, functions or operations as discussed above in connection with the illustrative methods 200 and/or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer-readable or software instructions relating to the above described methods can be perceived as a programmed processor or a specialized processor. As such, the present module 405 for classifying mobile traffic for securing a network or a mobile user endpoint device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device comprising:
    a processor; and
    a computer-readable medium storing instructions which, when executed by the processor, cause the processor to perform operations, the operations comprising:
        classifying mobile network traffic of a network as being associated with one or more mobile software applications of a plurality of mobile software applications using a probabilistic model for the plurality of mobile software applications, wherein the probabilistic model is based on a distribution of domain names;
        detecting an anomaly associated with a mobile software application of the plurality of mobile software applications based on the mobile network traffic classified as being associated with the one or more mobile software applications, wherein the anomaly comprises at least one of: a security event or a performance issue;
        verifying a set of one or more of the domain names is associated with the mobile software application in response to the detecting of the anomaly; and
        performing one or more remedial actions to address the anomaly based on the verifying, wherein the one or more remedial actions comprise: sending a notification to a mobile endpoint device having the mobile software application, wherein the notification contains a request to a user of the mobile endpoint device having the mobile software application to deactivate or deinstall the mobile software application, blocking mobile traffic from a functional domain name correlated to the mobile software application, or throttling the mobile traffic from the functional domain name correlated to the mobile software application.

2. The device of claim 1, wherein the one or more remedial actions further comprise sending a notification to a developer of the mobile software application.

3. The device of claim 1, wherein the one or more remedial actions further comprise sending a notification to an entity responsible for the mobile endpoint device having the mobile software application.

4. The device of claim 3, wherein the entity comprises a business entity, a governmental agency, a guardian or a parent.

5. The device of claim 1, wherein the one or more remedial actions further comprise allocating an additional network resource to address the anomaly.

6. The device of claim 1, wherein the one or more remedial actions further comprise blocking mobile traffic from the mobile endpoint device having the mobile software application.

7. The device of claim 1, the operations further comprising:
    retraining the probabilistic model on a periodic basis.

8. A method comprising:
    classifying, by a processor, mobile network traffic as being associated with one or more mobile software applications of a plurality of mobile software applications using a probabilistic model for the plurality of mobile software applications, wherein the probabilistic model is based on a distribution of domain names;
    detecting, by the processor, an anomaly associated with a mobile software application of the plurality of mobile software applications based on the mobile network traffic classified as being associated with the one or more mobile software applications, wherein the anomaly comprises at least one of: a security event or a performance issue;
    verifying, by the processor, a set of one or more of the domain names is associated with the mobile software application in response to the detecting of the anomaly; and
    performing, by the processor, one or more remedial actions to address the anomaly based on the verifying, wherein the one or more remedial actions comprise: sending a notification to a mobile endpoint device having the mobile software application, wherein the notification contains a request to a user of the mobile endpoint device having the mobile software application to deactivate or deinstall the mobile software application, blocking mobile traffic from a functional domain name correlated to the mobile software application, or throttling the mobile traffic from the functional domain name correlated to the mobile software application.

9. The method of claim 8, wherein the one or more remedial actions further comprise sending a notification to a developer of the mobile software application.

10. The method of claim 8, wherein the one or more remedial actions further comprise sending a notification to an entity responsible for the mobile endpoint device having the mobile software application.

11. The method of claim 10, wherein the entity comprises a business entity, a governmental agency, a guardian or a parent.

12. The method of claim 8, wherein the one or more remedial actions further comprise allocating an additional network resource to address the anomaly.

13. The method of claim 8, wherein the one or more remedial actions further comprise blocking mobile traffic from the mobile endpoint device having the mobile software application.

14. A tangible computer-readable medium storing instructions which, when executed by a processor, cause the processor to perform operations, the operations comprising:
   classifying mobile network traffic as being associated with one or more mobile software applications of a plurality of mobile software applications using a probabilistic model for the plurality of mobile software applications, wherein the probabilistic model is based on a distribution of domain names;
   detecting an anomaly associated with a mobile software application of the plurality of mobile software applications based on the mobile network traffic classified as being associated with the one or more mobile software applications, wherein the anomaly comprises at least one of: a security event or a performance issue;
   verifying a set of one or more of the domain names is associated with the mobile software application in response to the detecting of the anomaly; and
   performing one or more remedial actions to address the anomaly based on the verifying, wherein the one or more remedial actions comprise: sending a notification to a mobile endpoint device having the mobile software application, wherein the notification contains a request to a user of the mobile endpoint device having the mobile software application to deactivate or deinstall the mobile software application, blocking mobile traffic from a functional domain name correlated to the mobile software application, or throttling the mobile traffic from the functional domain name correlated to the mobile software application.

15. The tangible computer-readable medium of claim 14, wherein the one or more remedial actions further comprise sending a notification to a developer of the mobile software application.

16. The tangible computer-readable medium of claim 14, wherein the one or more remedial actions further comprise sending a notification to an entity responsible for the mobile endpoint device having the mobile software application.

17. The tangible computer-readable medium of claim 14, wherein the one or more remedial actions further comprise allocating an additional network resource to address the anomaly.

18. The tangible computer-readable medium of claim 14, wherein the one or more remedial actions further comprise blocking mobile traffic from the mobile endpoint device having the mobile software application.

* * * * *